(12) United States Patent
Samolowicz

(10) Patent No.: US 6,336,532 B1
(45) Date of Patent: Jan. 8, 2002

(54) BACKING PLATE WITH REINFORCING MEMBERS

(75) Inventor: H. Joseph Samolowicz, St. Charles, IL (US)

(73) Assignee: Anchor Brake Shoe, L.L.C., West Chicago, IL (US)

( * ) Notice: Subject to any disclaimer, the term of this patent is extended or adjusted under 35 U.S.C. 154(b) by 0 days.

(21) Appl. No.: 09/782,997

(22) Filed: Feb. 15, 2001

(51) Int. Cl.[7] .................................. F16D 65/04
(52) U.S. Cl. ........................ 188/247; 188/243
(58) Field of Search ........................ 188/243, 247, 188/248, 250 B, 250 G

(56) References Cited

U.S. PATENT DOCUMENTS

| | | |
|---|---|---|
| 1,328,595 A | 1/1920 | Sargent |
| 1,373,538 A | 4/1921 | Thompson |
| 2,885,037 A | 5/1959 | Wilson |
| 4,466,513 A | 8/1984 | Dedek |
| 5,234,082 A | 8/1993 | Christie |
| 5,341,904 A * | 8/1994 | Christie .................. 188/250 B |
| 5,407,031 A * | 4/1995 | Christie ....................... 188/29 |
| 5,595,267 A | 1/1997 | Kahr |
| 5,704,454 A * | 1/1998 | Kahr .......................... 188/247 |

* cited by examiner

Primary Examiner—Chris Schwartz
(74) Attorney, Agent, or Firm—Cook, Alex, McFarron, Manzo, Cummings & Mehler, Ltd.

(57) ABSTRACT

A backing plate for a railroad brake shoe includes side edges, ends, and an integral lug section located remote from the ends. The backing plate has a generally convex top surface, a generally concave bottom surface, and a longitudinal axis. Located transverse to the longitudinal axis, the lug section has an arcuate shape with an apex and legs and has a plurality of reinforcing members which are integrally formed as part thereof. The apex of the lug section forms a key or lug slot for insertion of a key which secures the backing plate to a brake head. The reinforcing members can take the form of at least one reinforcing rib which is laterally spaced from the lug slot and extends generally parallel to the longitudinal axis of the backing plate. The reinforcing member may also be comprised of an offset portion. Bores may be located on the periphery of the backing plate to impart additional strength thereto.

21 Claims, 2 Drawing Sheets

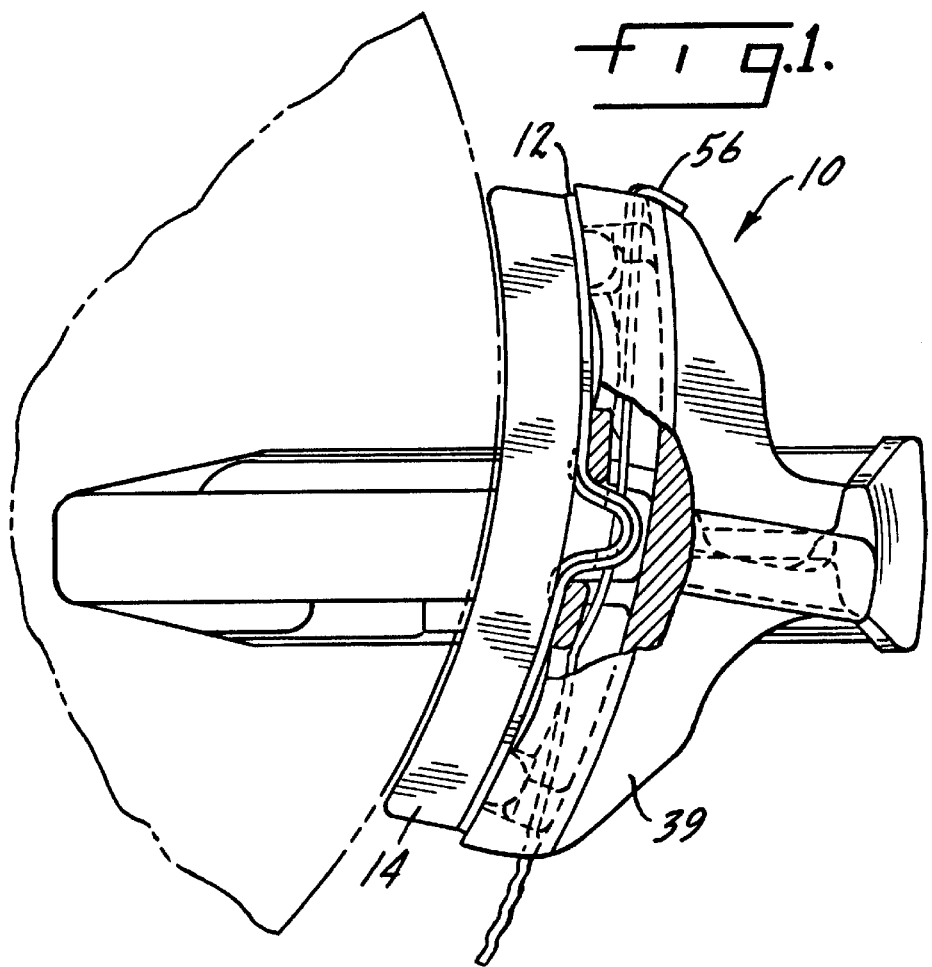
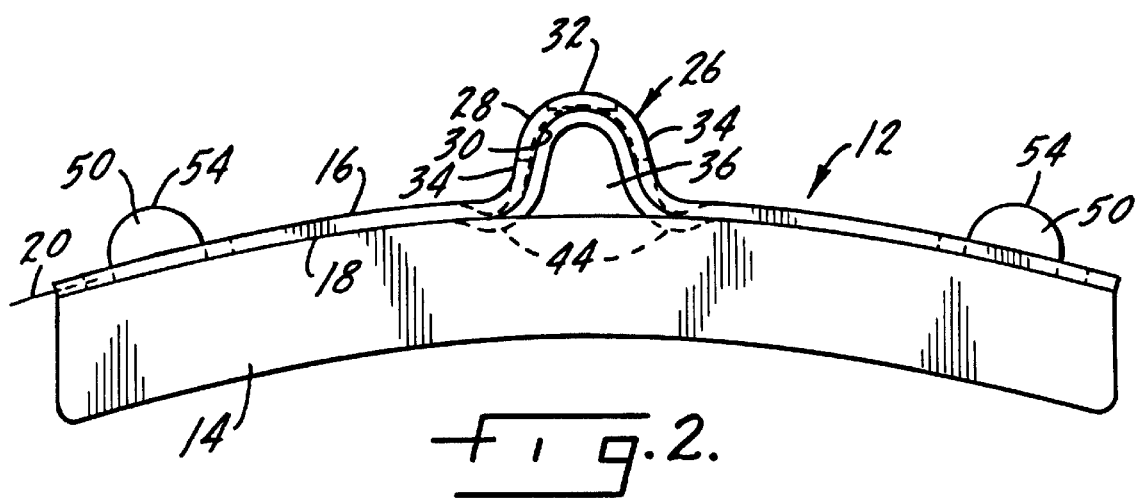

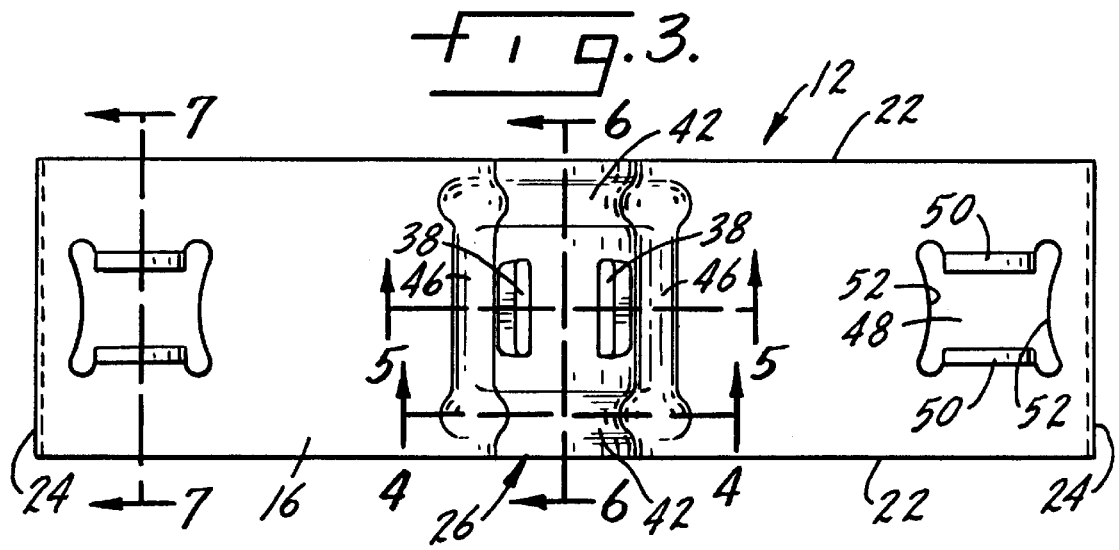
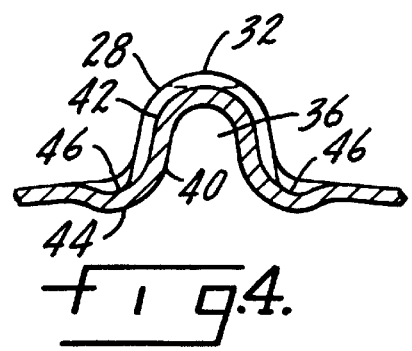
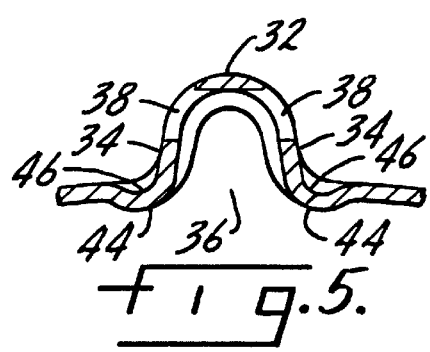
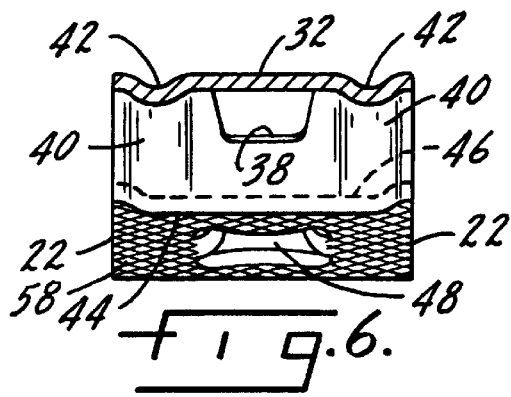
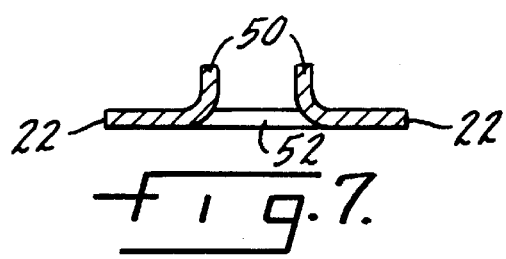
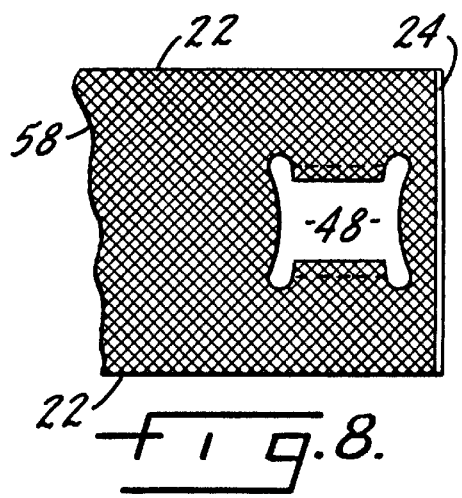

BACKING PLATE WITH REINFORCING MEMBERS

FIELD OF THE INVENTION

The present invention relates to a backing plate for a railroad brake shoe.

Generally, the brake shoe has a backing plate made of metal which is mounted to the brake shoe material. The backing plate has a lug or key way slot within a lug section to permit the backing plate to be attached to a brake head. The brake head in turn is attached to a brake beam of a railroad car. After the brake shoe is attached to the brake head, it is positioned to selectively engage a wheel of the railroad car upon movement supplied by the brake head. Vibration and loading at the lug slot causes stress to occur at the lug section and causes weakening thereof. Brake failures occur when the lug section has been so severely weakened that it breaks apart.

Prior brake shoe art has tried to solve this problem by adding separate reinforcing structures to the lug section of the backing plate. Such structures are bonded, molded, clamped or inserted into the lug section. While these reinforcing structures provide addition strength to an unsupported lug section, the additional structures can create additional stress points. Moreover, testing has shown that a backing plate without a separate reinforcing structure is not as strong as a backing plate which has a reinforcing structure formed as an integral part thereof.

Specifically, where the integrally formed reinforcing structure was in the form of reinforcing ribs, the ribbed backing plate withstands intact up to 75 minutes of vibration with no signs of failure whereas the non-ribbed backing plates average 14 minutes before failing. The ribbed backing plate also has achieved stronger results in relation to deflection tests performed on a flat surface. In such tests, the ribbed backing plate required a force which is 21.6% larger than the non-ribbed backing plate in order to move the backing plate 0.06 inches downward. Thus, it is desirous to create a backing plate which incorporates a reinforcing structure as an integral part of the backing plate.

The present invention provides a backing plate for a railroad car brake shoe that has integrally formed reinforcing structures thus providing a reinforced backing plate formed as a single uniform piece.

SUMMARY OF THE INVENTION

The present invention relates to a backing plate for a railroad car brake shoe where a backing plate lug section has a reinforcing structure integrally formed therewith.

A primary purpose of the invention is to provide a backing plate for a brake shoe which incorporates reinforcing structures as part of the backing plate lug section thus forming a single reinforced backing plate.

Another purpose of the invention is to provide a stronger lug section for the backing plate which withstands greater stress and vibrational forces applied thereto.

Another purpose of the invention is to provide reinforcing structures for the backing plate in the form of reinforcing ribs formed within the lug section.

Another purpose of the invention is to provide a steel backing plate where the reinforcing structures are stamped into the steel backing plate thus making a one piece design without need for reinforcing inserts.

BRIEF DESCRIPTION OF THE DRAWINGS

The invention is illustrated diagrammatically in the following drawings wherein:

FIG. 1 shows a brake shoe with a backing plate of the present invention.

FIG. 2 shows a side view of the backing plate.

FIG. 3 shows a top view of the backing plate.

FIG. 4 shows a section along plane 4—4 of FIG. 3.

FIG. 5 shows a section along plane 5—5 of FIG. 3.

FIG. 6 shows a section along plane 6—6 of FIG. 3.

FIG. 7 shows a section along plane 7—7 of FIG. 3.

FIG. 8 shows an bottom view of the backing plate.

DETAILED DESCRIPTION OF THE INVENTION

In FIG. 1, the brake shoe 10 has a continuous metal backing plate 12 which is bonded to brake shoe material 14. FIGS. 2 through 8 illustrate the backing plate 12 in detail having a generally convex top surface 16 and a generally concave underside 18 along a longitudinal axis 20. It has side edges 22 generally parallel to the axis and ends 24 generally perpendicular to the axis. Centrally positioned on the backing plate 12 is an arcuate lug section 26 having a top surface 28 and an underside 30. The lug section 26 has a lug apex 32 connected to the backing plate by down turned legs 34. The apex 32 and legs 34 form an arcuate or U-shaped lug section 26 which is transverse to the longitudinal axis 20 of the backing plate. The lug section 26 defines a key cavity 36 with key or lug slots 38 positioned in the legs 34 adjacent a lug apex 32 to receive a key or lug 56 when securing the backing plate to the brake head 39.

In FIGS. 3–6 the backing plate lug section 26 has at least one reinforcing member 40 positioned therein. Although the reinforcing member is shown as a reinforcing rib 40, other structures and orientations are also possible including but not limited to variations in the lug section thickness. Even where the reinforcing structure takes the form of a rib, other linear, non-linear, curved or diagonal rib orientations may be formed either on the top surface 28 or on the underside 30. Another possible orientations for the reinforcing members may be intersecting ribs. In FIGS. 3 through 6, the reinforcing member is shown as a reinforcing rib 40 which is integrally formed as part of the backing plate lug section 26 to impart greater strength thereto and to prevent weakening thereof during operation of the railroad brake shoe. Thus, the reinforcing structures in the backing plate lug section form a single reinforced backing plate which can withstand higher levels of vibration force applied thereto.

Although any number of reinforcing ribs can be used, it is preferred that at least two reinforcing ribs are integrally formed in a lug section in alignment with the longitudinal axis with one reinforcing rib being positioned on each side of the backing plate between the lug slot 38 and the side edges 22. The reinforcing ribs 40 extend into the cavity 36 and generally match the shape of the arcuate underside 30 of the lug section apex 32 and a substantial portion of the lug section legs 34. The lug section top surface 28 has longitudinally disposed grooves 42 which correspond to the reinforcing ribs 40 positioned on the lug section underside 30.

In FIG. 6 an offset portion 44 is formed on the underside 30 of the lug section and is positioned at the bottom of the lug section legs 34. The offset portion 44 forms a raised or projecting surface which is generally planar and approximate to the length formed between the reinforcing ribs 40. The offset portion 44 may be formed by joining the individual ribs which are laterally spaced from each other at the top and middle portions of the legs 34 into one continuous rib or offset portion at the bottom of the lug section legs thereby merging the ribs into the offset portion which contacts the brake shoe material. A groove portion 46 is located on the top surface 28 which corresponds to the offset portion 44. Alternatively, it is may also possible to allow the reinforcing ribs to extend to the bottom of the lug section legs instead of merging them into one offset portion.

Turning to the remaining structure of the backing plate 12, a bore 48 is disposed at the periphery of the backing plate adjacent each end 24 thereof being defined by side edges 50 and ends 52. The side edges 50 are generally parallel to the backing plate side edges 22 and the ends 52 have a generally convex shape extending inwardly into the bore. The side edges 50 are formed from upturned portions of the backing plate and form generally planar surfaces having a top curved edge 54. The side edges 50 aid in fitting the backing plate 12 against the brake head and insure that the brake shoe cannot be misapplied to the railroad wheel. As shown in FIG. 8, the backing plate underside 18 which contacts the brake material 14 may have a knurled surface 58.

During assembly of the backing plate, the brake shoe material 14 is securely mounted to the backing plate. The resulting brake shoe is installed between the brake head and the railroad wheel with a key 56 of the brake head being inserted through the lug slots 38 of the backing plate in order to securely position the brake shoe.

The backing plate 12 is made from a single piece of steel material. The reinforcing ribs or other reinforcing members are stamped into the steel at the lug section. During use of the backing plate in the brake shoe, the reinforced backing plate provides a single steel back brake shoe which imparts greater strength to the lug section and prevents weakening of the lug section during operation of the railroad brake shoe without the addition of reinforcing inserts.

Whereas a preferred form of the invention has been shown and described, it is understood that there may be many modifications, substitutions and alterations thereto. For instance, although two reinforcing ribs are shown laterally spaced from the lug slots, any number, orientation and combinations are possible. It is also possible to use a reinforcing member other than a rib so long as the reinforcing member is integrally formed with the backing plate to form a single reinforced backing plate. Moreover, the reinforcing members are shown as integrally formed with the lug section underside which forms a portion of the backing plate underside, but it is understood that other positions are possible such as being positioned elsewhere on the backing plate underside or anywhere on the top surface thereof so long as the reinforcing members are integrally formed as part of the backing plate.

What is claimed is:

1. A backing plate for a railroad brake shoe having a backing plate with side edges, and ends, said backing plate having a generally convex top surface, a generally concave underside, a longitudinal axis and an arcuate lug section which is positioned remote from said backing plate ends and transverse to said longitudinal axis, said lug section having lug slots and defining a key cavity, said lug section having a top surface, an underside and a plurality of reinforcing members located thereon, said lug section underside being deformed inwardly in spaced relation to said lug slots and said lug section top surface being coextensively deformed such that said reinforcing members are integrally formed with said lug section without requiring attachment thereto, said reinforcing members imparting greater strength to the lug section and preventing weakening thereof during operation of the railroad brake shoe.

2. The backing plate of claim 1 wherein the reinforcing member is an offset portion inwardly formed on said lug section underside and a groove portion coextensively formed on said lug section top surface.

3. The backing plate of claim 2 wherein said offset portion and said groove portion are longitudinally spaced from said lug slots.

4. The backing plate of claim 2 wherein said offset portion and said groove portion are laterally disposed on said lug section.

5. The backing plate of claim 2 wherein said lug section has legs joined to an apex, said offset portion and said groove portion being positioned on each lug section leg.

6. The backing plate of claim 1 wherein at least one bore is formed in the periphery of the backing plate from at least one upturned portion of the backing plate.

7. The backing plate of claim 6 wherein the bore is formed from two upturned portions of the backing plate, the upturned portions defining the bore side edges.

8. The backing plate of claim 1 wherein said lug section underside is inwardly deformed to provide a plurality of reinforcing ribs laterally spaced from said lug slots and said lug section top surface being coextensively deformed to provide a plurality of grooves, said reinforcing ribs and said grooves being longitudinally disposed along said lug section.

9. The backing plate of claim 8 wherein said lug section has two reinforcing ribs and two grooves longitudinally disposed thereon, an offset portion extending laterally between said reinforcing ribs, and a groove portion extending laterally between said grooves.

10. The backing plate of claim 1 wherein the lug section has at least two reinforcing members.

11. The backing plate of claim 1 wherein said lug section underside is deformed inwardly to provide a plurality of reinforcing ribs.

12. The backing plate of claim 1 wherein said plurality of reinforcing members are laterally spaced from the lug slots along the lug section.

13. The backing plate of claim 1 wherein said lug section top surface is coextensively deformed to provide a plurality of grooves.

14. The backing plate of claim 1 wherein the backing plate underside has a knurled surface.

15. The backing plate of claim 1 wherein said plurality of reinforcing members are longitudinally spaced from said lug slots.

16. The backing plate of claim 1 wherein said plurality of reinforcing members are laterally disposed along said lug section.

17. The backing plate of claim 1 wherein said plurality of reinforcing members are longitudinally disposed along said lug section.

18. A brake shoe for braking a railroad car wheel comprising:

a backing plate having a generally convex top surface, a generally concave bottom surface and a longitudinal axis, said backing plate having a centrally located lug section which is transverse to the longitudinal axis of the backing plate, said lug section having a top surface, an underside, lug slots and at least one reinforcing member, said lug section underside being deformed inwardly in spaced relation to said lug slots and said lug section top surface being coextensively deformed so as to integrally form said reinforcing members with said lug section without requiring attachment thereto, such that the reinforcing member provides greater strength to the backing plate and prevents weakening thereof during operation of the railroad brake shoe; and a brake shoe material which is mounted to the backing plate underside for braking engagement with the railroad car wheel.

19. The brake shoe of claim 15 wherein the reinforcing member is an offset portion formed on said lug section underside and a groove portion coextensively formed on said lug section top surface.

20. The brake shoe of claim 15 wherein a plurality of reinforcing ribs are formed in said lug section underside and a plurality of arcuate grooves are coextensively formed in said lug section top surface.

21. The brake shoe of claim 15 wherein at least two reinforcing members are formed in the lug section.

* * * * *